United States Patent
Golbeck et al.

(10) Patent No.: US 9,977,820 B1
(45) Date of Patent: May 22, 2018

(54) SYSTEM AND METHOD FOR SYNCHRONIZING STATES IN ASSOCIATED DATA RECORDS

(71) Applicant: TaskTop Technologies, Incorporated, Vancouver (CA)

(72) Inventors: Ryan Golbeck, Vancouver (CA); Doug Janzen, Vancouver (CA); Robert Elves, Vancouver (CA)

(73) Assignee: TASKTOP TECHNOLOGIES, INCORPORATED, Vancouver (CA)

( * ) Notice: Subject to any disclaimer, the term of this patent is extended or adjusted under 35 U.S.C. 154(b) by 1060 days.

(21) Appl. No.: 13/833,901

(22) Filed: Mar. 15, 2013

(51) Int. Cl.
*G06F 7/00* (2006.01)
*G06F 17/00* (2006.01)
*G06F 17/30* (2006.01)

(52) U.S. Cl.
CPC .............................. *G06F 17/30575* (2013.01)

(58) Field of Classification Search
CPC ................................................ G06F 17/30575
USPC ........................................................ 707/618
See application file for complete search history.

(56) References Cited

U.S. PATENT DOCUMENTS

| | | | |
|---|---|---|---|
| 5,301,320 A | | 4/1994 | McAtee et al. |
| 5,706,509 A | | 1/1998 | Man-Hak Tso |
| 5,970,501 A | | 10/1999 | Hunkins et al. |
| 6,298,370 B1 * | | 10/2001 | Tang ................... G06F 9/5044 718/100 |
| 6,397,192 B1 | | 5/2002 | Notani et al. |
| 6,460,051 B1 * | | 10/2002 | LaRue et al. |
| 6,505,200 B1 | | 1/2003 | Ims et al. |
| 7,480,907 B1 * | | 1/2009 | Marolia et al. ............... 717/174 |
| 7,496,606 B2 | | 2/2009 | Hind et al. |
| 7,516,167 B2 | | 4/2009 | Selman et al. |
| 7,565,381 B2 * | | 7/2009 | Oswalt |
| 7,607,130 B2 | | 10/2009 | Singh et al. |
| 7,693,888 B2 | | 4/2010 | Urscheler et al. |
| 7,962,448 B2 * | | 6/2011 | Creamer et al. ............. 707/611 |
| 8,131,672 B2 * | | 3/2012 | Hind et al. ................... 707/610 |

(Continued)

FOREIGN PATENT DOCUMENTS

| | | |
|---|---|---|
| EP | 2 160 689 A2 | 3/2010 |
| EP | 2169552 A1 | 3/2010 |

OTHER PUBLICATIONS

Janzen, "System and Method for Repairing Data Synchronization Links," U.S. Appl. No. 13/834,365, filed Mar. 15, 2013, 16 pages.

(Continued)

*Primary Examiner* — Heather Herndon
*Assistant Examiner* — Lin Lin Htay
(74) *Attorney, Agent, or Firm* — Seed IP Law Group LLP

(57) ABSTRACT

A system for synchronizing states in associated for data records has been developed. The system includes a first data repository (R1) containing a first data record (DR1) and a second data repository (R2) containing a second data record (DR2). The system also includes a synchronizer that initiates synchronization activity between DR1 and DR2. Upon change in DR1, the system generates a listing of all possible target states for DR2 and determines the correct target state of DR2 from the listing of possible target states. The system then determines if DR2 is in the correct target state. If not, the system transitions DR2 to the correct target state, and synchronizes the data of DR2 with DR1.

23 Claims, 4 Drawing Sheets

(56) References Cited

U.S. PATENT DOCUMENTS

| | | |
|---|---|---|
| 8,315,976 B2 | 11/2012 | Multer et al. |
| 2002/0059299 A1 | 5/2002 | Spaey |
| 2004/0148299 A1 | 7/2004 | Teegan et al. |
| 2006/0069809 A1* | 3/2006 | Serlet ................ G06F 17/30174 709/248 |
| 2007/0083813 A1* | 4/2007 | Lui .................... G06F 11/3612 715/709 |
| 2007/0282802 A1 | 12/2007 | Wilhelm |
| 2008/0201362 A1* | 8/2008 | Multer .............. G06F 17/30174 |
| 2010/0011337 A1 | 1/2010 | Young et al. |
| 2010/0017792 A1 | 1/2010 | Young et al. |
| 2010/0145910 A1* | 6/2010 | Zhao et al. ................... 707/620 |
| 2011/0047126 A1* | 2/2011 | Vargas et al. ................. 707/618 |
| 2011/0258160 A1* | 10/2011 | Lee ........................ G06Q 10/00 707/626 |
| 2014/0280528 A1* | 9/2014 | Brandes ............. G05B 19/0426 709/204 |

OTHER PUBLICATIONS

Janzen, "System and Method for Repairing Data Synchronization Links," Preliminary Amendment filed Apr. 7, 2014, for U.S. Appl. No. 13/834,365, 22 pages.

Kisynski et al., "Systems and Methods to Synchronize Artifact Relationships Across a Plurality of Repositories," U.S. Appl. No. 14/571,113, filed Dec. 15, 2014, 63 pages.

\* cited by examiner

SYSTEM AND METHOD FOR SYNCHRONIZING STATES IN ASSOCIATED DATA RECORDS

FIELD

The invention relates generally to a system and method of synchronizing states in associated data records across different data repositories.

BACKGROUND

Many computer software applications and development projects store a wide variety of data records in multiple locations commonly referred to as "data repositories". The data records may be operated on independently but should always be in a compatible state with each other. Consequently, a system and method for synchronizing states in associated data records is needed.

SUMMARY

In some aspects, embodiments of the invention relate to a system for synchronizing states in associated data records, comprising: a first data repository (R1) containing a first data record (DR1); a second data repository (R2) containing a second data record (DR2); a synchronizer that initiates synchronization activity between DR1 and DR2; where the system generates a listing of all possible target states for DR2; and where, upon a change in DR1, the system, determines the correct target state of DR2 from the listing of all possible target states, determines if DR2 is in the correct target state, transitions DR2 to the correct target state, and synchronizes the data of DR2 with DR1.

In other aspects, embodiments of the invention relate to a method for synchronizing states in associated data records, comprising: detecting a change in a first data record (DR1) located in a first data repository (R1); initiating synchronization activity between DR1 and a second data record (DR2) located in a second data repository (R2); generating a listing of all possible target states for DR2; determining the correct target state of DR2 from the listing of all possible target states; determining if DR2 is in the correct target state; transitioning DR2 to the correct target state; and synchronizes the data of DR2 with DR1.

Other aspects and advantages of various embodiments of the invention will be apparent from the following description and the appended claims.

BRIEF DESCRIPTION OF DRAWINGS

It should be noted that identical features in different drawings are shown with the same reference numeral.

DETAILED DESCRIPTION

A system and method for synchronizing states of data records across multiple data repositories or software applications has been developed. The embodiments of the present invention include multiple data repositories and a synchronizer that serves to synchronize the data links between the repositories.

Figure 1:
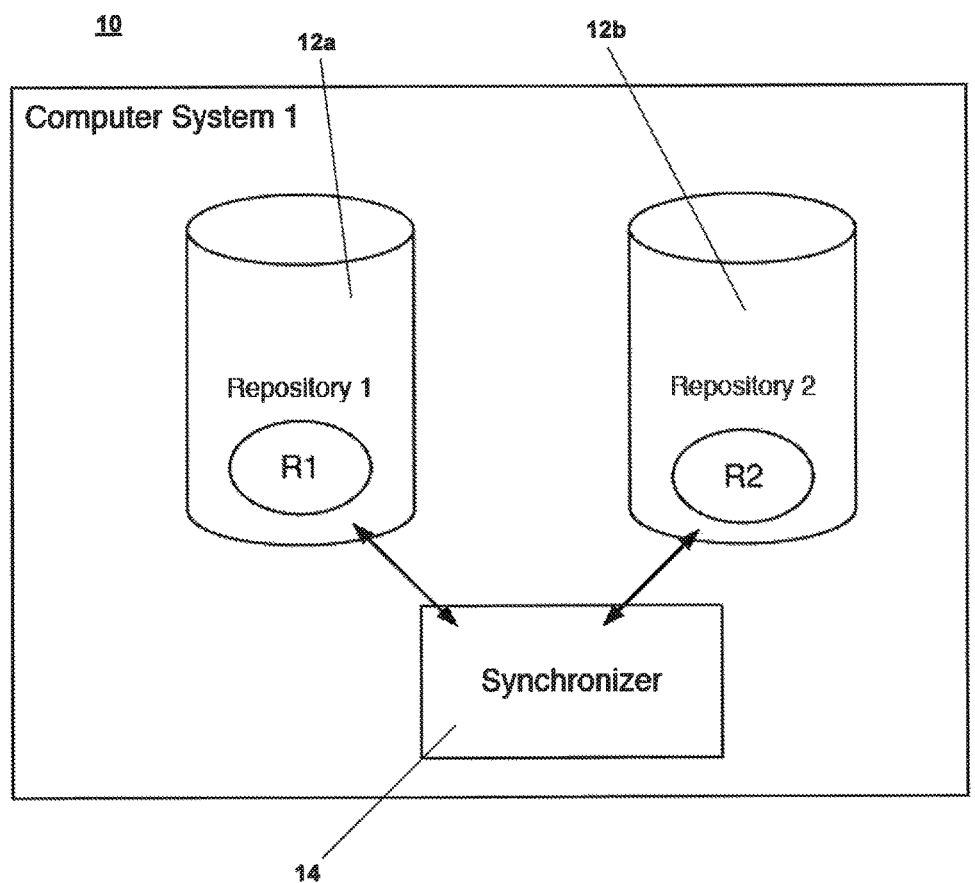
FIG. 1 is a diagram showing a single computer system with multiple data repositories in accordance with one embodiment of the present invention.
Figure 2:
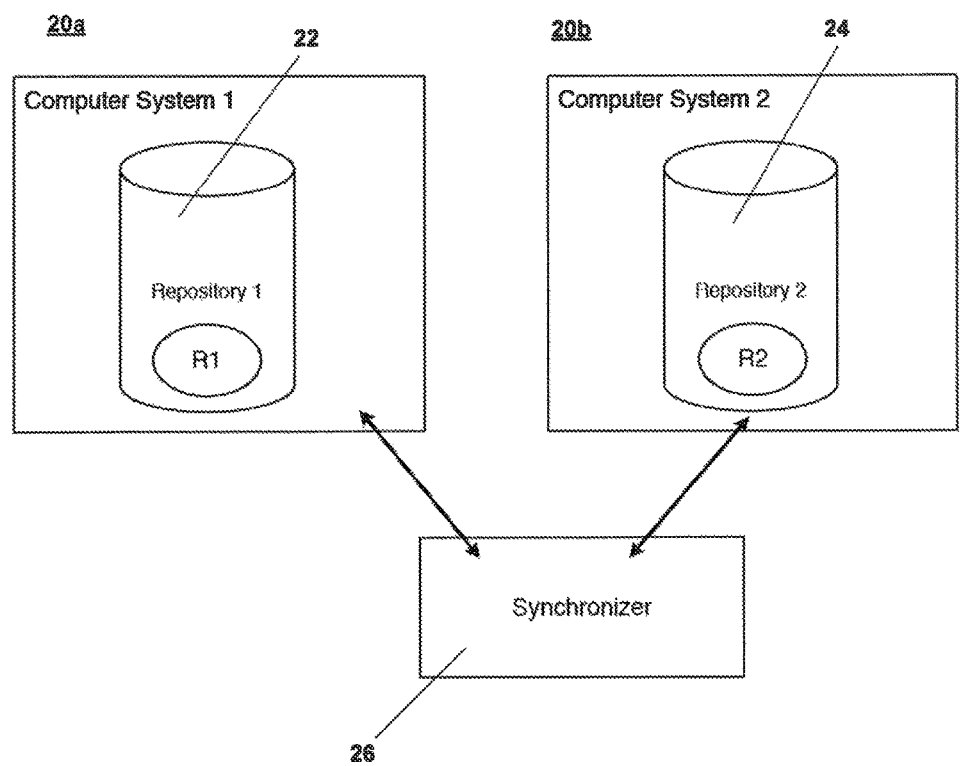
FIG. 2 is a diagram showing two separate computer systems each with a data repository in accordance with one embodiment of the present invention.

The data repositories containing data to be synchronized may be on the same computer system or may be spread across different computer systems. The data records could exist in the same data repository or different data repositories. FIG. 1 shows a single computer system with multiple data repositories in accordance with one embodiment of the present invention. In this embodiment, a single computer system 10 contains two independent data repositories 12a and 12b. The computer system 10 also includes a data synchronizer 14 that is in communication with both repositories 12a and 12b. It should be understood that the data repositories are not limited to being part of a single computer system. Each repository could be located on a separate computer system as depicted in the embodiment shown in FIG. 2. In this example, two separate computer systems 20a and 20b each have a single respective data repository 22 and 24. These repositories 22 and 24 are in communication with a data synchronizer 26 that is separate from each computer system 20a and 20b. It should be understood, that multiple computer systems with multiple data repositories could be used within the scope of the present invention. Also, multiple data synchronizers could be used in such embodiments as well. In embodiments with multiple computer systems, a computer network links all computer systems hosting a data repository or synchronizer. In other embodiments, the computer systems may be smart phones, tablets or other mobile communication devices.

Independent data repositories may hold two or more similar data records. Each data record has fields that represent the state of the record in a "workflow", which is a sequence of states, described by a graph, which the records may move through. The repository or application housing the data record typically defines the workflow for a data record based on the type of the data record. As part of one example embodiment of the invention, each data record on each data repository participating in synchronization has one or more fields to represent the state of the data record. All possible legal states of a particular data record type and legal transitions between states are described by a state transition diagram. For a transition to be taken for a data record, there may be other fields on the data record that must be set to literal values for the transition to be legal.

Figure 3A:
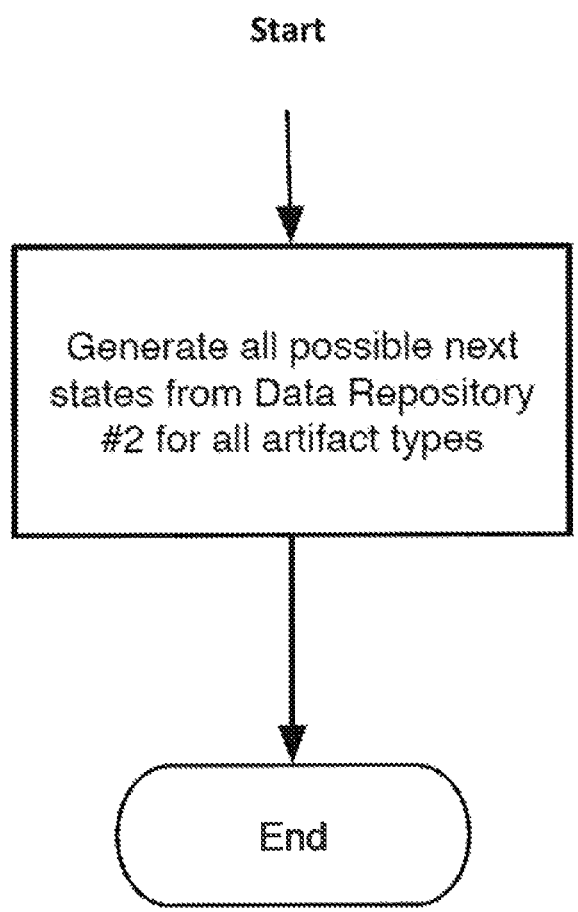
FIGS. 3A and 3B are flow charts depicting a method of synchronizing states of associated data records in accordance with one embodiment of the present invention.
Figure 3B:
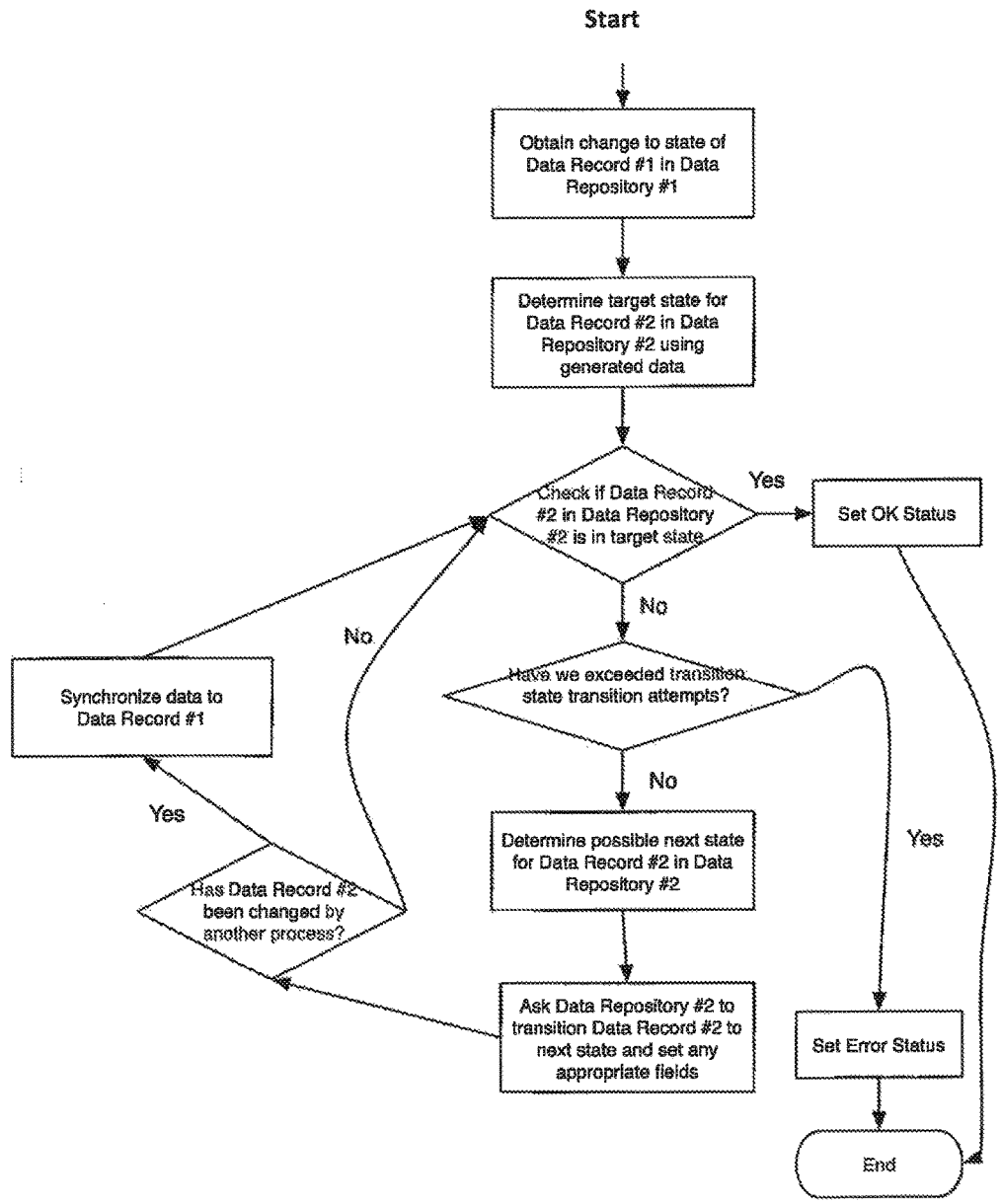

Embodiments of the present invention synchronizes states in similar data records stored in separate data repositories by treating workflow as data. Once states in two systems are detected as incompatible, the synchronizer system will push the data in the second data repository into the correct state. FIGS. 3A and 3B give an example of this embodiment. Referring to FIG. 3A, first all possible next states are generated for all artifact types in a second data repository (Repository #2 or "R2"). The possible "next states" are generated from state transition diagrams stored per artifact type in the data repository. The "artifacts" include types of data records such as defects, bugs, tasks, requirements, etc.

Referring to FIG. 3B, the synchronizer system now detects a change to a first data record in a first repository (Data Record #1 or "DR1" of Repository #1 or "R1"). Next, the target state for an associated second data record (Data Record #2 or "DR2") in R2 is determined. The target state was previously generated in the process in FIG. 3A. If DR2 is in the "proper target state" which is a state that is compatible with the state of the associated data record, then the status is set to "OK" in the synchronizing system and the process ends.

However, if DR2 is not in the proper target state, the system checks to see if a predetermined limit on attempts to transition the state has been exceeded. A limit on transition attempts is set to prevent endless looping errors. Instead, if the limit has been exceeded, an error status is set and the process ends. If the limit on attempts has not been exceeded, the next state for DR2 is set along with any other appropriate fields. As DR2 moves to a new state, a user configuration file can specify that certain fields be set. Finally, DR2 is checked to determine if it has been changed by another process. These other processes could include a change by another workflow synchronizer, another system and/or another user. If it has, the data in fields of DR2 is synchronized with associated data fields of DR1.

One example of a practical application of embodiments of the present invention include a software development team involved in troubleshooting software bugs. The team uses one software system that record bugs that are reported about their software applications. The organization uses a second software system in which to record tests that are used to determine if the applications are executing as desired. To help track tests used to determine if a bug is fixed, the team wants to represent "bugs" in the first system as "defects" in the second system. By synchronizing the bugs to defects, both programmers and testers can work with the same information. This example presumes a correspondence has been determined between bugs and defects in the two systems and that a state transition diagram has been generated for defect artifacts in the second system including any fields that must be set for a given transition to be legal. This example also presumes that it can access a configuration file that describes a target state for a defect for each state of a bug and any constraints on setting other fields in the defect when a transition is taken.

When a change to a state of a bug in the first system is detected, the synchronizer system looks up the target state in the configuration file for a corresponding defect in the second system. For example, a bug may go from an "OPEN" to a "RESOLVED" state. The synchronizer system determines from the configuration file that a corresponding second system should transition from "NEW" to "CLOSED" where a field on the defect is also set to the literal value "Resolved".

The defect in the second system is in the "NEW" state. The synchronizer system now looks up in the data generated from the defect artifact state transition diagram that a defect can go from "NEW" to "ASSIGNED" but not directly from "NEW" to "CLOSED". The method asks the second system to transition the defect to "ASSIGNED". It then checks to see if "ASSIGNED" is the target state. Since it is not, the method asks the second system to transition the defect to the target "CLOSED" state. Since "ASSIGNED" to "CLOSED" is legal in the second system's defect state transition diagram, the second system defect is transitioned. The method also sets the required field to "Resolved". The transition is taken and the data in each repository is now compatible.

Finally, the synchronizer system also checks, before actually taking the transition for the second system defect, whether there has been any change since the last check of the state (in case another process is changing the record). If so, user-configured conflict detection rules as used to determine how to proceed. Typically, user-configured conflict detection rules are part of a user configuration file that resolves conflicts by either an override instruction or declaring an error.

Embodiments of the present invention can be implemented across a wide variety of applications and uses. For example, embodiments of the present invention could be used with Application Lifecycle Management (ALM) records, project portfolio management (PPM) and tickets in an IT help or support system management (ITSM). Embodiments of the present invention could also be used in Customer Relationship and Sales Management systems that also take data records through various workflow states (e.g., lead, opportunity, etc.). The workflow in these systems might be similar to procedures to handle Application Lifecycle Management (ALM) data. Embodiments of the present invention could then be used to move data simultaneously in two customer relationship or sales management systems into similar or compatible states.

Additionally, the embodiments of the present invention could be used to synchronize data for health records. For instance, a mobile phone app might have a representation of an individual's health record (or part of a health record) and this might be synchronized with a hospital or lab's view of the same record where the workflow could be "stable" to "waiting for lab result" to "waiting for lab interpretation" to "lab results available", etc.

While embodiments of the present invention have been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A system to synchronize states in associated for data records, the system comprising:
   one or more processors; and
   a synchronizer that, when executed by at least one of the one or more processors:
      determines, based at least in part on a current state of a first data record (DR1) contained by a first data repository (R1) and on state transition information associated with a second data record (DR2) that includes all possible target states for the second data record (DR2), a correct target state of the second data record (DR2), wherein the second data record (DR2) is contained by a second data repository (R2);
      determines whether the second data record (DR2) is in the determined correct target state; and
      in response to a determination that the second data record (DR2) is not in the determined correct target state:
         transitions the second data record (DR2) to the determined correct target state in accordance with the associated state transition information; and
         synchronizes at least some data of the second data record (DR2) with data of the first data record (DR1).

2. The system of claim 1 where in use, the synchronizer further:
   determines whether a total number of transition attempts at transitioning the second data record (DR2) has exceeded a limit on transition attempts; and
   sets an error status for the second data record (DR2) in response to a determination that the total number of transition attempts at transitioning the second data record (DR2) has exceeded the limit on transition attempts.

3. The system of claim 2 where in use, the synchronizer terminates attempts at transitioning the second data record (DR2) in response to the total number of transition attempts exceeding the limit on transition attempts.

4. The system of claim 1 wherein the first data repository (R1), the second data repository (R2) and the synchronizer all reside on a first computer system.

5. The system of claim 4 wherein the first computer system is a mobile communications device and the first data repository (R1), the second data repository (R2), and the synchronizer all reside on the mobile communications device.

6. The system of claim 1, wherein the first data repository (R1) and the second data repository (R2) each reside on respective ones of a plurality of separate computer systems.

7. The system of claim 6 wherein the first data repository (R1) and the second data repository (R2) are communicatively connected over the Internet.

8. The system of claim 1 wherein the first data repository (R1) and the second data repository (R2) reside on separate ones of a plurality of mobile communications devices.

9. The system of claim 1 wherein determining the correct target state of the second data record (DR2) is performed in response to one or more indications of a change in the first data record (DR1).

10. The system of claim 1 wherein the synchronizer is responsive to a change in a state of the first data record (DR1).

11. The system of claim 1 wherein at least one component of the system generates a listing of all possible target states for second data record (DR2).

12. The system of claim 1 wherein the first data record (DR1) is associated with additional state transition information that includes a listing of all possible target states for the first data record (DR1).

13. The system of claim 1 wherein the current state of the first data record (DR1) is distinct from the determined correct target state of the second data record (DR2), and wherein the associated state transition information indicates an association of the correct target state for the second data record (DR2) with the current state of the first data record (DR1).

14. A computer-implemented method for synchronizing states in associated data records which associated data records include at least a first data record (DR1) of a first data repository (R1) and a second data record (DR1) of a second data repository (R2), the second data repository (R2) different from the first data repository (R1), the method comprising:
  determining, by at least one computing system and based at least in part on a current state of the first data record (DR1), a correct target state of the second data record (DR2) from a listing of all possible target states of the second data record (DR2);
  determining, by the at least one computing system, if the second data record (DR2) is in the determined correct target state;
  transitioning, by the at least one computing system, the second data record (DR2) to the determined correct target state in response to a determination that the second data record (DR2) is not in the determined correct target state; and
  synchronizing data of the second data record (DR2) with corresponding data of the first data record (DR1).

15. The method of claim 14, further comprising:
  determining whether a total number of attempts at transitioning the second data record (DR2) has exceeded a limit on transition attempts; and
  setting an error status for the second data record (DR2) in response to the total number of attempts at transitioning the second data record (DR2) exceeding the limit on transition attempts.

16. The method of claim 14 wherein synchronizing data of the second data record (DR2) with corresponding data of the first data record (DR1) includes synchronizing data of the second data record (DR2) of the second data repository (R2) which resides on a first computer system with corresponding data of the first data record (DR1) of the first data repository (R1) which resides on the first computer system, by a synchronizer implemented on the first computer system.

17. The method of claim 14 wherein synchronizing data of the second data record (DR2) with corresponding data of the first data record (DR1) includes synchronizing data of the second data record (DR2) of the second data repository (R2) which resides on a first computer system with corresponding data of the first data record (DR1) of the first data repository (R1) which resides on a second computer system, the second computer system different from the first computer system.

18. The method of claim 17 wherein synchronizing data of the second data record (DR2) with corresponding data of the first data record (DR1) includes synchronizing data of the second data record (DR2) of the second data repository (R2) with corresponding data of the first data record (DR1) over the Internet.

19. The method of claim 14, wherein synchronizing data of the second data record (DR2) with corresponding data of the first data record (DR1) includes synchronizing data of the second data record (DR2) of the second data repository (R2) which resides on a first mobile communications device with corresponding data of the first data record (DR1) of the first data repository (R1) which resides on the first mobile communications device, by a synchronizer implemented on the first mobile communications device.

20. The method of claim 14 wherein synchronizing data of the second data record (DR2) with corresponding data of the first data record (DR1) includes synchronizing data of the second data record (DR2) of the second data repository (R2) which resides on a first mobile communications device with corresponding data of the first data record (DR1) of the first data repository (R1) which resides on a second mobile communications device, the second mobile communications device different from the first mobile communications device.

21. The method of claim 14, further comprising:
  detecting a change in the first data record (DR1) located in a first data repository (R1).

22. The method of claim 14, further comprising:
  generating the listing of all possible target states for the second data record (DR2).

23. The method of claim 14, wherein determining a correct target state of the second data record (DR2) includes determining the correct target state based at least in part on state transition information associated with the second data record (DR2) that associates the current state of the first data record (DR1) with the determined correct target state of the second data record (DR2).

* * * * *